United States Patent
Bilcu et al.

(10) Patent No.: US 8,275,200 B2
(45) Date of Patent: Sep. 25, 2012

(54) METHOD, A DEVICE, A MODULE AND A COMPUTER PROGRAM PRODUCT FOR DETERMINING THE QUALITY OF AN IMAGE

(75) Inventors: Radu Bilcu, Tampere (FI); Markku Vehviläinen, Tampere (FI)

(73) Assignee: Nokia Siemens Netowrks Oy, Espoo (FI)

( * ) Notice: Subject to any disclaimer, the term of this patent is extended or adjusted under 35 U.S.C. 154(b) by 959 days.

(21) Appl. No.: 12/308,235

(22) PCT Filed: Jun. 9, 2006

(86) PCT No.: PCT/FI2006/050244
§ 371 (c)(1),
(2), (4) Date: Dec. 9, 2008

(87) PCT Pub. No.: WO2007/141368
PCT Pub. Date: Dec. 13, 2007

(65) Prior Publication Data
US 2009/0245633 A1   Oct. 1, 2009

(51) Int. Cl.
*G06K 9/00* (2006.01)
*G06K 9/40* (2006.01)
*G06K 9/34* (2006.01)

(52) U.S. Cl. .................. 382/167; 382/254

(58) Field of Classification Search ............ 382/162, 382/164, 165, 167, 254, 255, 260, 266, 274, 382/275; 345/589, 596, 601, 611
See application file for complete search history.

(56) References Cited

U.S. PATENT DOCUMENTS

| | | | | |
|---|---|---|---|---|
| 7,437,012 | B2 * | 10/2008 | Carasso | 382/255 |
| 7,627,193 | B2 * | 12/2009 | Alon et al. | 382/275 |
| 7,728,844 | B2 * | 6/2010 | Trimeche et al. | 345/589 |
| 7,903,902 | B2 * | 3/2011 | Sheraizin et al. | 382/274 |
| 2002/0168115 | A1 | 11/2002 | Sumitomo et al. | |
| 2003/0128888 | A1* | 7/2003 | Li | 382/260 |
| 2005/0147313 | A1* | 7/2005 | Gorinevsky | 382/255 |
| 2005/0231603 | A1 | 10/2005 | Poon | |
| 2005/0244077 | A1 | 11/2005 | Kitamura et al. | |
| 2006/0013479 | A1 | 1/2006 | Trimeche et al. | |
| 2009/0046944 | A1* | 2/2009 | Bilcu et al. | 382/274 |
| 2009/0245633 | A1* | 10/2009 | Bilcu et al. | 382/167 |

FOREIGN PATENT DOCUMENTS

| | | |
|---|---|---|
| EP | 1 589 479 | 10/2005 |
| WO | 2006/005798 | 1/2006 |
| WO | 2006/041126 | 4/2006 |

* cited by examiner

*Primary Examiner* — Amir Alavi

(57) ABSTRACT

The invention relates to a method, a device, an image quality evaluation module and a computer program product for determining the quality of an image. In an input image, at least one color component is iteratively restored with a deblur parameter, which deblur parameter is increased at each iteration. The iteration is stopped when an overshooting in the final image exceeds a predetermined value. After the iteration has been stopped, a number of iterations is defined and the quality of the image is determined according to the number of iterations.

27 Claims, 3 Drawing Sheets

METHOD, A DEVICE, A MODULE AND A COMPUTER PROGRAM PRODUCT FOR DETERMINING THE QUALITY OF AN IMAGE

This application is a 371 of PCT/FI2006/050244 filed on Jun. 09, 2006.

FIELD OF THE INVENTION

The current invention relates generally to image processing and, in particular, to such image processing where the quality of an image is evaluated.

BACKGROUND OF THE INVENTION

Currently increasingly more mobile devices are equipped with digital cameras for capturing still images and video. The quality of images and video improves continuously but there is still a need for specific applications to evaluate the quality. Image quality estimation is an important task for example for mobile printing, the processing of a large image database, memory saving and the recapturing of an image. In mobile printing, a portable printer can be directly connected to the mobile device and the image can be printed directly without transferring it to a personal computer (PC). In connection with a large image database, the image quality estimation can be applied in order to automatically delete images having a low quality. On the other hand, when image capturing is in process, images having a low quality are not necessarily saved in the memory of the mobile device but the user can be asked to recapture the image.

Among many digital imaging applications incorporated in mobile devices, the printing capability can be considered one of the most important ones. Miniaturized printers suitable to be connected to the mobile devices are already available on the market. By means of such printers, images captured by a mobile device can be directly printed without transferring them to a PC, when such a printer is connected to the mobile device. One of the main problems in mobile printing is the image quality. In mobile printing, the image is not transferred to the PC but is printed directly from the mobile device; therefore, the quality of the captured image cannot be accurately verified. Even though the image is shown on the display of the mobile device prior to the printing process, the resolution of the display is smaller than the resolution of the image, which may make the image having a low quality look like an image having a high quality on the display. In addition, the image that is shown on the display of the mobile device is usually pre-processed in order to attenuate non-linearities of the display and to adapt to the display characteristics. Both of these factors may affect the image in such a manner that low quality images are seen as high quality images when shown on the display of the mobile device. In consequence, methods for image quality estimation are of great interest for mobile printing.

As stated earlier, other applications that can apply image quality estimation include large image database processing and memory management. In the case of large image database processing, an automatic mechanism to verify the image quality can be used and the images that have low quality can be automatically deleted from the database. In this manner, the database will be cleared without user interference. In the case of the memory management application, the image quality estimation can be used to define the quality of every captured image. Immediately after the image has been captured, a parameter quantifying the image quality on a certain scale (from poor quality to excellent quality) is shown on the display of the mobile device and the user is asked whether to save the image or not. In this manner, the low quality images will not be saved in the memory, wherein the memory will be saved for better images. Moreover, when a low quality image is detected, the user can choose to capture an image of the same scene again (with different parameters or a different viewing angle) so that the information contained in the scene will not be lost. Also the image quality can be used for instance to choose a quality factor in a JPEG encoder in order to obtain the best trade-off between the memory usage and the visual quality of the encoded images.

As stated above, the image quality estimation can be incorporated in a mobile device having an imaging capability. However, in addition to mobile devices, the image quality estimation can be incorporated in digital cameras or similar devices. Many image processing algorithms and applications can use information on the quality of the captured image to improve the performance of such algorithms and applications.

Conventional methods for image quality estimation can be categorized in three main classes. The first class is Full-Reference Quality Metric also known as a fidelity metric. The algorithms of this class require an original undistorted image to be available. Usually mean squared error (MSE), peak signal to noise ratio (PSNR) or other metrics are computed to quantize the difference between the distorted image and the undistorted image. This class of image estimation methods is mainly used to estimate the performances of the restoration algorithms. In such a case an original undistorted image is artificially distorted and the distorted image is processed by a certain algorithm. The output image is then compared with the original undistorted image.

The second class of metrics is called Reduced-Reference Quality Metric. The algorithms of this class compute statistics from the distorted image and from the undistorted image. The quality of the distorted image is estimated on the basis of the comparison of these statistics. The original undistorted image is not available in some applications in practice, and therefore methods for image quality applications that do not require the use of the original image are necessary.

The third class of metrics is called No-Reference Quality Metric, in which an original image is not used for image quality estimation. The image quality is computed without the need of any information about the undistorted image. Usually, several distortions are estimated from the image, such as noise level, the amount of blur, blocking artifacts etc. There are many algorithms for estimating a certain distortion in the state-of-art. For instance in the case of blur estimation, several algorithms based on signal activity measurement and on the estimation of the edge length are available.

SUMMARY OF THE INVENTION

The aim of the current invention is to provide a solution for estimating image quality, which solution is based on iterative image restoration. This can be achieved by a method, a device, an image quality evaluation module and a computer program product for determining a quality of an image.

In the method at least one color component in an input image is iteratively restored with a deblur parameter, which deblur parameter is increased at each iteration, wherein the iteration is stopped when an overshooting in the final image exceeds a predetermined value, wherein a number of iterations is defined and the quality of the image is determined according to the number of iterations.

The device comprises an image processing system being capable of restoring at least one color component in an input image iteratively with a deblur parameter, and increasing the deblur parameter at each iteration, wherein the image processing system is arranged to stop the iteration when an overshooting in the final image exceeds a predetermined value. The image processing system is further capable of defining a number of iterations and determining the quality of the image according to the number of iterations.

The image quality evaluation module is capable of restoring at least one color component in an input image iteratively with a deblur parameter, and increasing the deblur parameter at each iteration, which image quality evaluation module is arranged to stop the iteration when an overshooting in the final image exceeds a predetermined value, and is capable of defining a number of iterations and determining the quality of the image according to the number of iterations.

The computer program product comprises a computer code stored on a readable medium adapted and when run in a computer, to restore at least one color component in an input image iteratively with a deblur parameter, and to increase the deblur parameter at each iteration, and to stop the iteration when an overshooting in the final image exceeds a predetermined value, and to define a number of iterations and to determine the quality of the image according to the number of iterations.

The method according to the invention is based on iterative image restoration. The methods of the prior art are intended for estimating distortions from the input image directly without performing image restoration. In the method described in this patent application, image restoration is performed, and the restoration is also used for evaluating image quality. The advantage is that at the output of the processing block the image quality and also the restored image are available together. The methods of the prior art only estimate the image quality without restoring the image.

Because both the restored image and the quality index of the image are available at the output of the image quality evaluation module if the whole image is used for quality estimation, there is no need to perform a separate restoration after the image quality has been estimated. In addition, the user is hence given a possibility to see both the input image and the restored image when the decision for utilizing the image has to be made.

DESCRIPTION OF THE DRAWINGS

The current invention will be described in more detail by means of the following detailed disclosure and with reference to accompanying drawings, in which.

DETAILED DESCRIPTION OF THE INVENTION

Figure 1:
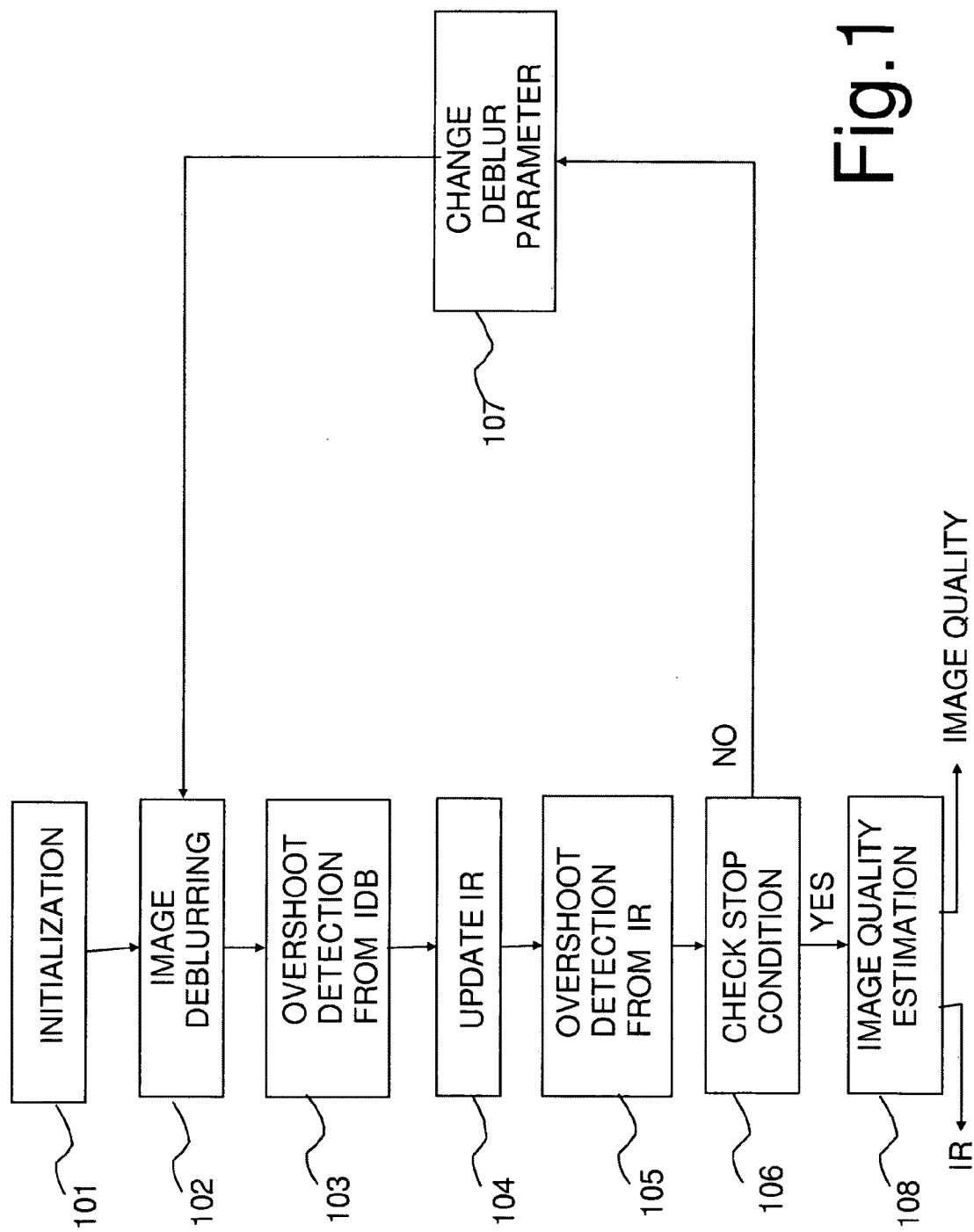
FIG. 1 illustrates an example of the method in a simplified block chart.

The invention relates utilizing an iterative restoration algorithm (as disclosed by the applicant in WO 2006/005798) to estimate the amount of blur in digital images. An example of a method according to the invention is illustrated in FIG. 1 as a block chart. The first step 101 in the method is an initialization step, where parameters are setup and a final image is initialized. The parameters that are initialized here, are different from the parameters for a deblurring algorithm (being described later) and relate for example to thresholds, to the maximum number or iterations. In the second step 102, an input image is restored, i.e. deblurred, using a non-iterative procedure with the parameters chosen in the first step. In the third step 103, pixels that contain overshooting in the restored image are detected. The pixels that contain overshooting exceeding a predefined threshold are marked as distorted. The final image is then (in the fourth step 104) updated with the pixels from the restored image that were not marked as distorted. In the fifth step 105, the pixels that contain overshooting in the final image are detected. After the fifth step 105, a stopping rule is applied 106. If there is a pixel containing overshooting exceeding a predefined threshold, the iterative restoration process is stopped. Otherwise, the parameters of the deblurring algorithm are changed 107 and the iterative process is continued from the second step 102. When the iterative process is stopped, the number of iterations and eventually the restored image are returned. The image quality index is inversely proportional to the number of iterations necessary to restore the image.

The method steps described above with reference to FIG. 1 will now be described in more detail. The method can be applied for one of the color components of a color image, which color component can be selected from RGB system (Red, Green, Blue). After one color component has been processed, the other components may processed separately in the same manner. Even though it is mentioned that the components are processed separately, one after the other, the processes can also be implemented in parallel in order to receive the quality information substantially at the same time. However, because different color components can have different contents, these color components should be processed separately from each other. The current invention can also be applied to the YUV system (luminance/chrominance), but then only the intensity component Y needs to be processed.

Parameter Initialization (101)

For parameter initialization, an input image is denoted by I and a final image (restored image) by Ir. The final image Ir is then initialized with 1, so that Ir=I at the beginning. Parameters of the deblurring method will be initialized next. For instance, if an unsharp masking method is used for deblurring, the number of blurred images used and their parameters are chosen. If another algorithm is implemented, such as another non-iterative deblurring, e.g. high pass filtering, its parameters will be set up at this point. A matrix of a size equal to the size of the image and to unity elements will be initialized. This matrix is denoted by mask.

Deblurring of the Input Image (102)

After initialization, a deblurring algorithm is applied to the input image I. This means that the input image I is restored, i.e. deblurred with the parameters chosen in the first step 101. The deblurring algorithm can be any of the existing one pass algorithms such as the unsharp masking method, blur domain deblurring, differential filtering, etc. As a result of the deblurring, a deblurred image Idb will be obtained.

Pixel Checking in the Deblurred Image (103)

In this step, pixels of the deblurred image Idb are checked to detect overshooting such as over-amplified edges. The pixels from the deblurred image Idb are scanned, and horizontal and vertical differences between adjacent pixels can be computed as follows:

$$dh1(x,y) = Idb(x,y) - Idb(x,y-1)$$

$$dh2(x,y) = Idb(x,y) - Idb(x,y+1)$$

$$dv1(x,y) = Idb(x,y) - Idb(x-1,y)$$

$$dv2(x,y) = Idb(x,y) - Idb(x+1,y)$$

where x, y represent vertical and horizontal pixel coordinate respectively. Also the pixels from the input image are scanned, and horizontal and vertical differences between the adjacent pixels can be computed as follows:

$$dh3(x,y)=I(x,y)-I(x,y-1)$$

$$dh4(x,y)=I(x,y)-I(x,y+1)$$

$$dv3(x,y)=I(x,y)-I(x-1,y)$$

$$dv4(x,y)=I(x,y)-I(x+1,y)$$

The checking is applied for every pixel of the color component in question in the deblurred image Idb in order to determine whether the signs of corresponding differences dh1 and dh3, dh2 and dh4, dv1 and dv3, and dv2 and dv4 are different. If the corresponding differences are different, the pixel at coordinates x, y contains overshooting. The checking procedure can be carried out by following algorithm:

```
if NOT[sign(dh1(x,y))=sign(dh3(x,y))] OR
NOT[sign(dh2(x,y))=sign(dh4(x,y))]
    if [abs(dh1(x,y))>=th1*MAX] AND [abs(dh2(x,y))>=th1*MAX]
        mh=0;
    end
end
if NOT[sign(dv1(x,y))=sign(dv3(x,y))] OR
NOT[sign(dv2(x,y))=sign(dv4(x,y))]
    if [abs(dv1(x,y))>=th1*MAX] AND [abs(dv2(x,y))>=th1*MAX]
        mv=0;
    end
end
if (mh=0) OR (mv=0)
    mask(x,y)=0;
end
```

The idea above is basically that for every pixel in the deblurred image Idb the local shape of the deblurred image Idb is compared with the local shape of the input image I. This is done by comparing the signs of the corresponding differences in the input image and the deblurred image Idb in the horizontal and vertical directions. When a difference is detected in the shape of the input image I and the deblurred image Idb (whether in the horizontal or vertical direction), the corresponding pixel in the deblurred image Idb may be highlighted too much. An estimated value of the overshooting of those pixels is compared with a threshold (th1*MAX). If the amount of overshooting exceeds the threshold (th1*MAX), the corresponding pixel is marked as distorted (the value of the mask is made equal to zero). The threshold (th1*MAX) is defined percent from the maximum value of the pixels from the input image I (the value MAX is the maximum value of I). Choosing this kind of a threshold computation, it can be ensured that the value of the threshold (th1*MAX) is adapted to the image range.

Updating the Pixels in the Restored Image (104)

In this step, the restored image Ir is updated. The pixels that form the restored image are updated with such pixels in the deblurred image Idb that were not marked as distorted. This step can be implemented as follows:

```
for every pixel from Idb(x,y)
    if mask(x,y)=1
        Ir(x,y)=Idb(x,y);
    end
end
```

Detection of Overshooting Points in the Restored IMAGE (105)

In this step, the restored image Ir is scanned and the horizontal and vertical differences between adjacent pixels are computed and the maximum overshooting from the restored image Ir is determined as follows:

$$dh5(x,y)=Ir(x,y)-Ir(x,y-1)$$

$$dh6(x,y)=Ir(x,y)-Ir(x,y+1)$$

$$dv5(x,y)=Ir(x,y)-Ir(x-1,y)$$

$$dv6(x,y)=Ir(x,y)-Ir(x+1,y)$$

The signs of corresponding differences dh5 and dh3, dh6 and dh4, dv5 and dv3, and dv6 and dv4 are then compared (note that dh3, dh4, dv3 and dv4 were determined in the step 103). If the signs are different, then the amount of overshooting may be computed as follows:

```
If NOT[sign(dh5(x,y))=sign(dh3(x,y))] OR
NOT[sign(dh6(x,y))=sign(dh4(x,y))]
    H(x,y)=min(abs(dh5(x,y)),abs(dh6(x,y)));
end
If NOT[sign(dv5(x,y))=sign(dv3(x,y))] OR
NOT[sign(dv6(x,y))=sign(dv4(x,y))]
    V(x,y)=min(abs(dh5(x,y)),abs(dh6(x,y)));
end
```

Comparing the signs of the differences computed on the restored image Ir and on the input image I, the local shapes of the restored image Ir and the input image I can be compared. For those pixels where the local shapes differ, the overshooting in the restored image Ir is estimated by taking the minimum of the absolute value of the two adjacent differences. This is computed on both vertical and horizontal directions.

Stopping Rule (106)

In this step, the stopping rule is applied to the method. The stopping rule comprises a condition, which states that if the maximum overshooting of any pixel of the color component in question in the image is larger than a threshold, the restoration procedure is stopped. If there is no pixel in the restored image that has overshooting exceeding the threshold, the parameters of the deblurring method are changed (107) and the procedure is continued from step 102. If the condition of the stopping rule is fulfilled, i.e. the maximum overshooting exceeds a threshold, and the restoration procedure is stopped, the number of iterations is returned at the output. In addition to the number of iterations, also the restored image Ir can be returned at the output. This step can be implemented as follows:

```
if max(max(H(x,y)),max(V(x,y)))>=th2*MAX
    return the number of iterations and eventually the image Ir and stop
    the restoration process
else
    modify the parameters of the deblurring method and go to step 102.
end
```

The threshold th2 for the overshooting detection is defined as percents from the maximum pixel value of the original image I.

As an alternative, the stopping rule can also be implemented in the following manner. In step 105, the pixels that contain overshooting are detected. The overshooting of all these pixels are then averaged and the mean is compared to a threshold th2*MAX. If the average overshooting exceeds the threshold, the iterative procedure is stopped and the number of iterations is returned. Otherwise the parameters of the deblurring algorithm are changed (107) and the iterative procedure is continued from step 102.

In steps 103 and 106, decision thresholds are referred by th1*MAX and th2*MAX. However, also other threshold values can be used as the decision thresholds, for example such values that are calculated on the basis of the value of the pixels from the input image.

Image Quality Estimation (108)

At the time when the restoration procedure is stopped, the number of iterations is returned, which number of iterations can be used for estimating the quality of the image. The number of iterations can vary from 1 to a predetermined maximum number of iterations. The quality of the image is inversely proportional to the number of iterations necessary to perform image restoration. A larger number of iterations corresponds to a poor input image quality (the input image requires a large amount of deblurring). On the contrary, fewer iterations means that the input image is of high quality. The quality index for the image can be selected in two ways.

For example, the quality index can be equal to the number of iterations. This kind of a quality index should then be translated from a numerical value onto a scale from "poor quality" to "excellent quality". This can be done by a calibration that can be implemented e.g. in the following ways. The calibration can be done by the manufacturer by capturing several images of varying quality. Then a group of persons is requested to rank the quality of the images. The method of the current invention can then be applied for every image, and the numbers of iterations to restore them are saved. Based on the rank of every image, a correspondence between the number of iterations and the image quality can be established and saved in the mobile device as a lookup table. This kind of calibration must be done only once and not for every mobile device, and therefore the lookup table that relates the number of iterations to the image quality can be the same for the entire series of products. Another way of calibration is to do it once when the camera module is used for the first time. The user is asked to capture test images and then to rank their quality. The image quality measurement is then run on all the images and the correspondence is established.

The quality index can also depend on the total amount of blur in the input image I. In this possibility a blur space deblurring is used in step 102. This blur space is disclosed by e.g. J. Immerkaer in "Use of Blur-Space for Deblurring and Edge-Preserving Noise Smoothing", in IEEE Transaction on Image Processing, 2001. In the case of the current invention, the amount of deblurring at each iteration is known and is equal to d. If the total number or iterations is K, then the total amount of blur in the input image I is dK. For this procedure a calibration may not be needed. For example, if the blur model is Gaussian, a value dK=1 is already a large blur and the image can be considered to have low quality. A value of dK=0.1 can be assumed to correspond to a high quality image. Furthermore, the calibration based on the user preferences can also be included for more precise results.

Figure 2:
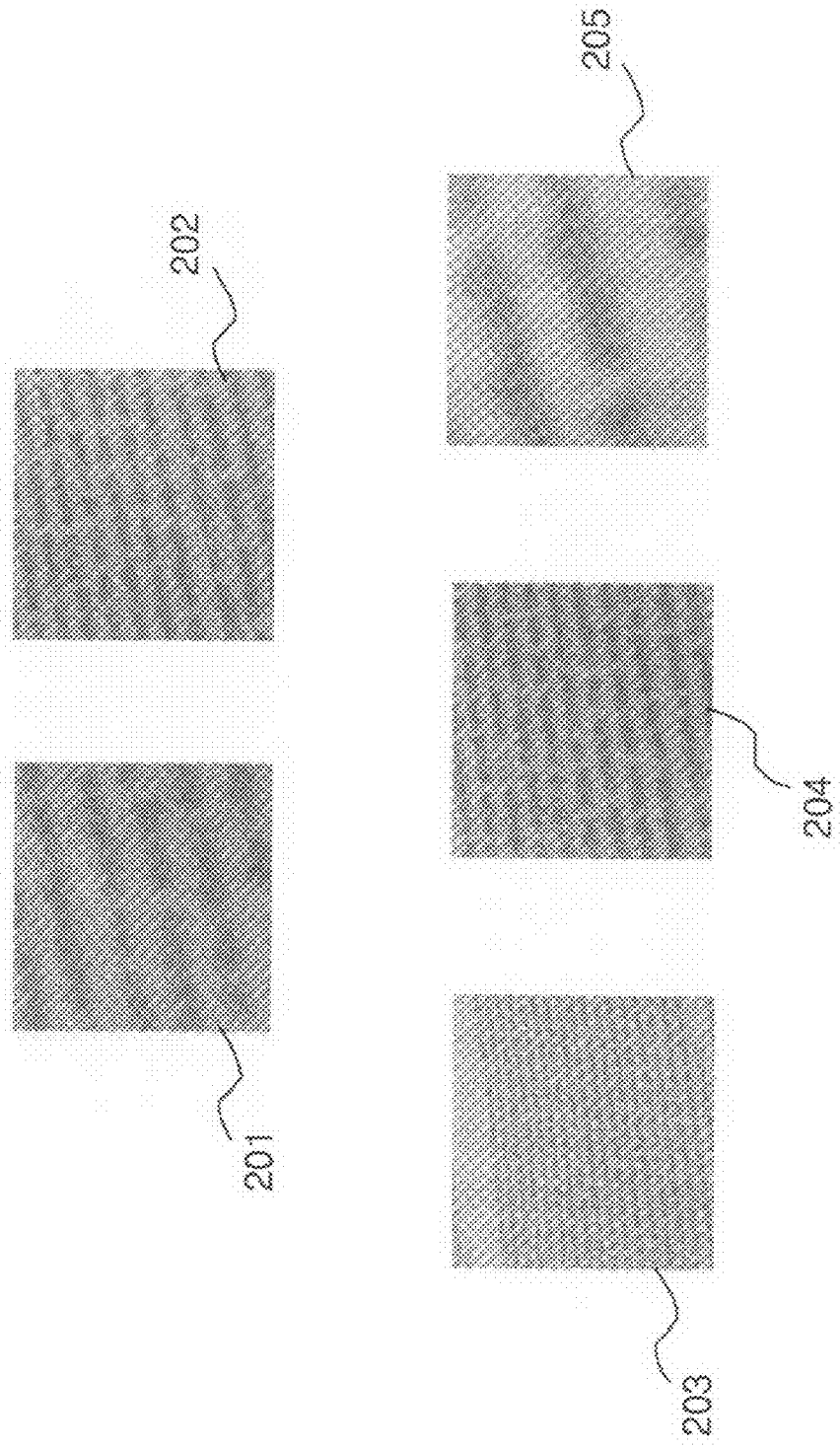
FIG. 2 illustrates examples of images having different qualities.

FIG. 2 illustrates examples of images (201-205) taken by a camera phone. It can be realized that the images have varying quality, e.g. image 205 has a lower quality and image 201 has a slightly better quality. Image 203 is an image with the best quality, followed by image 202 and then image 204. The quality estimation has also been tested by the inventors. In the first method the input color images were transformed to gray scale images. The iterative restoration method was applied to the images 201-205 and the number of iterations K is shown in Table 1 below:

TABLE 1

| | | Image quality | | | |
|---|---|---|---|---|---|
| | | Gray scale image processing | | Color image processing Average | |
| Image number | Image quality | Number of Iterations (K) | Quality factor (dK) | number of iterations (K) | Quality factor (dK) |
| 201 | Low | 10 | 1 | 8.3333 | 0.83333 |
| 202 | Medium | 4 | 0.4 | 4.6667 | 0.46667 |
| 203 | Good | 2 | 0.2 | 2.0000 | 0.20000 |
| 204 | Medium | 3 | 0.3 | 4.3333 | 0.43333 |
| 205 | Low | 14 | 1.4 | 11.0000 | 1.10000 |

The deblurring parameter for Table 1 was d=0.1, and the total amount of blur dK is also presented in Table 1 for each input image. It is possible to see from the numerical results in Table 1 that the number of iterations needed to restore the images is in agreement with the visual quality of all five images. Also the amount of blur dK is in agreement with the visual quality of images.

Another alternative to estimate the quality of the color input images is to apply the restoration algorithm separately on the R, G and B components. Usually, for a certain image, a different number of iterations can be obtained for the R, G and B components respectively. The final quality index corresponding to one input image is then an average of the number of iterations for the corresponding R, G and B components. These results are also shown in Table 1.

The current invention can be applied in mobile printing. When a user selects an image for printing, the quality of that image is estimated according to the invention. If the quality is low, the user is shown a warning about the low image quality and asked if the printing is desired to be continued. The advantage of using the method for image quality estimation is the fact that at the output of a quality evaluation module both the restored image and the quality index are available. In this way if the quality of the image is low and the user still wants to print the image, there is no need to restore the image (the restored image is already available).

Another example of a situation where the current invention can be applied is a situation where the user is capturing several images. The camera application can be equipped with an option named "Image Quality Check". If the user activates this option, the algorithm for quality estimation is applied on each captured image right after the image in question has been captured. If the quality of the captured image is high enough, the image is saved. Otherwise a warning message is shown to the user where the user is given two options; to save the image as it is or to shoot another one instead. This kind of a procedure for "Image Quality Check" will increase the user satisfaction due to the fact that only images having a sufficiently good quality are saved in the memory.

Figure 3:
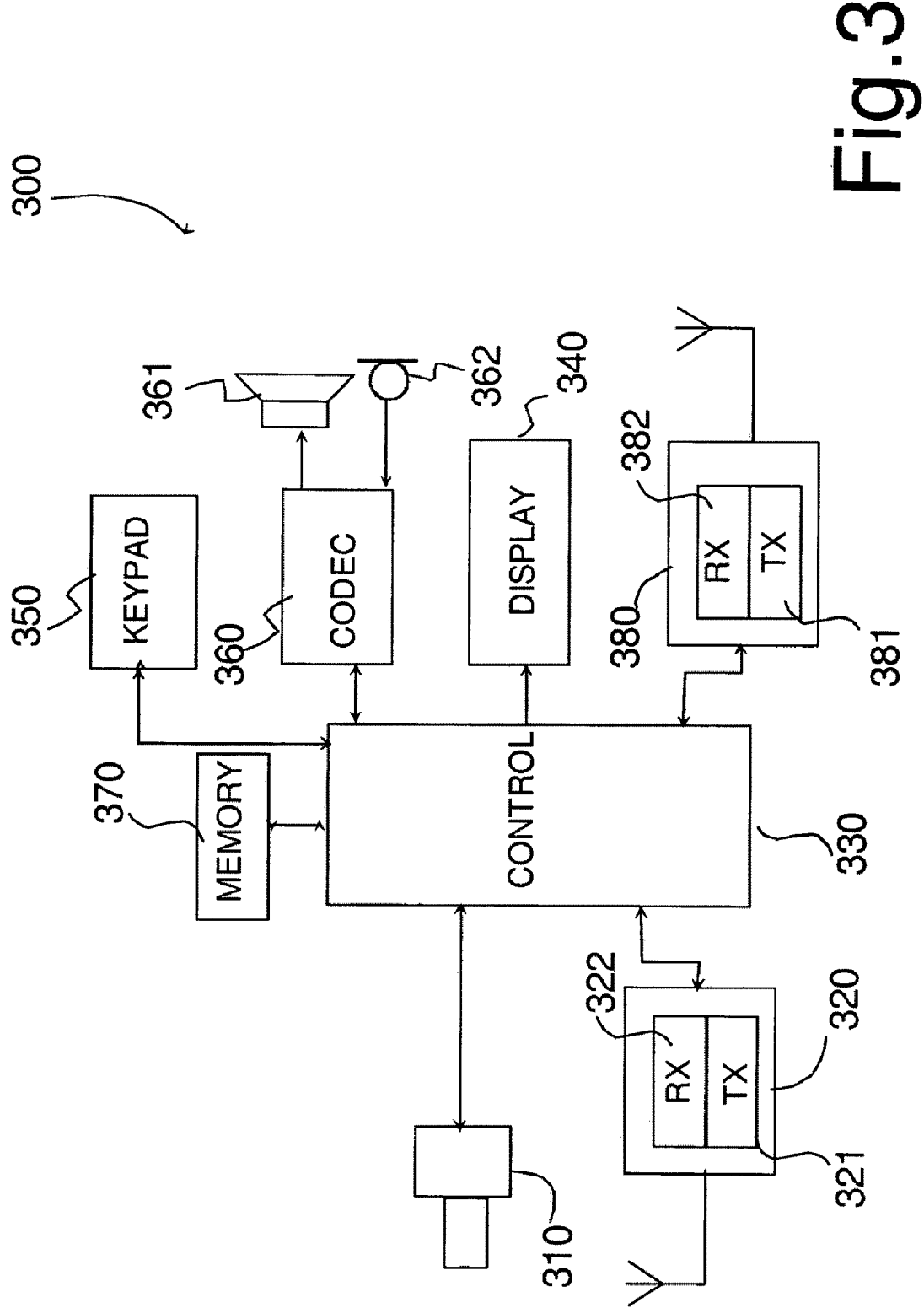
FIG. 3 illustrates an example of a device capable of utilizing the current invention.

An example of a device is illustrated in FIG. 3. The device can be an imaging phone, but also systems comprising any digital imaging camera module can utilize the solution of this description. Such devices include, for example web cameras, camcorders, surveillance cameras and other digital still or video image capturing devices. The device 300 comprises a camera module 310, optics or other means that communicate with the optics for capturing imaging data. The device 300 can also comprise a communication means 320 having a transmitter 321 and a receiver 322, or it can be connected to such. There can also be other communicating means 380 having a transmitter 381 and a receiver 382. The first communicating means 320 can be adapted for telecommunication and the other communicating means 380 can be a kind of a short-range communicating means suitable for local use and for communicating with another device. The device 300 according to the FIG. 3 also comprises a display 340 for displaying visual information and the imaging data being captured. In addition, the device 300 may comprise an interaction means, such as a keypad 350 for inputting data etc. In addition to or instead of the keypad 350, the device can comprise a stylus, if the display is a touch-screen display. The device 300 can also comprise audio means 360, such as an earphone 361 and a microphone 362, and optionally a codec for encoding (and decoding, if needed) the audio information. The device 300 also comprises a control unit 330 for controlling functions and applications running in the device 300. The control unit 330 may comprise one or more processors (CPU, DSP), one of which is used for example for images. The device further comprises a memory 370 for storing e.g. data, applications, and computer program code.

The method can be implemented by a computer program that is stored on a quality evaluation module. In use, the quality evaluation module can be arranged in an image processing system in the control module 330 of the device.

It will be clear that variations and modifications of the examples of the embodiment described are possible without departing from the scope of protection of the invention as set forth in the claims.

The invention claimed is:

1. A method comprising: using a processor to cause an apparatus to perform:
   restoring iteratively at least one color component in an input image with a deblur parameter,
   increasing said deblur parameter at each iteration,
   stopping the iteration when an overshooting in the final image exceeds a predetermined value,
   defining the number of iterations and
   determining quality of an image is determined according to the number of iterations.

2. The method according to claim 1, comprising using said processor to cause said apparatus to perform defining a quality index for the image according to the number of iterations.

3. The method according to claim 1, comprising using said processor to cause said apparatus to perform defining a quality index for the image according to the number of iterations multiplied with the amount of deblurring defined by the deblur parameter.

4. The method according to claim 1, comprising using said processor to cause said apparatus to perform defining the quality index for the image according to the average of the number of iterations of more than one color components, when more than one color components are restored iteratively.

5. The method according to claim 1, comprising using said processor to cause said apparatus to perform determining the image quality to be inversely proportional to the number of iterations.

6. The method according to claim 1, comprising using said processor to cause said apparatus to perform selecting the predetermined value as a determined function of the pixel value of the input image.

7. The method according to claim 6, wherein the predetermined value is a percentage of the maximum pixel value of the input image.

8. The method according to claim 1, comprising using said processor to cause said apparatus to perform stopping the iteration when an overshooting in one pixel of the final image exceeds the predetermined value.

9. The method according to claim 1, comprising using said processor to cause said apparatus to perform averaging an overshooting of all pixels in the final image comprising the overshooting and stopping the iteration when the average overshooting exceeds the predetermined value.

10. The method according to claim 1, wherein the color component belongs to an RGB (red, greed, blue) color system.

11. The method according to claim 1, wherein the color component is an intensity component of the YUV color system.

12. A device comprising an image processing system being configured to
    restore at least one color component in an input image iteratively with a deblur parameter,
    to increase the deblur parameter at each iteration,
    to stop the iteration when an overshooting in the final image exceeds a predetermined value,
    to define the number of iterations and
    to determine the quality of an image according to the number of iterations.

13. The device according to claim 12, wherein the image processing system is configured to define a quality index equal to the number of iterations.

14. The device according to claim 12, wherein the image processing system is configured to define a quality index equal to the number of iterations multiplied with the amount of deblurring defined by the deblur parameter.

15. The device according to claim 12, wherein when more than one color components are restored iteratively, the image processing system is configured to define a quality index equal to the average of the number of iterations of said more than one color components.

16. The device according to claim 12, wherein the image processing system is configured to determine the image quality to be inversely proportional to the number of iterations.

17. The device according to claim 12, wherein the predetermined value is a determined function of the pixel value of the input image.

18. The device according to claim 17, wherein the predetermined value is a percentage of the maximum pixel value of the input image.

19. The device according to claim 12, wherein the image processing system is configured to stop the iteration, when an overshooting in one pixel of the final image exceeds the predetermined value.

20. The device according to claim 12, wherein the image processing system is configured to average all pixels comprising the overshooting in the final image, and to stop the iteration when the average overshooting exceeds the predetermined value.

21. The device according to claim 12, comprising a camera module.

22. The device according to claim 12, comprising telecommunications means.

23. The device according to claim 12, wherein the color component belongs to the RGB (red, green, blue) color system.

24. The device according to claim 12, wherein the color component is an intensity component of the YUV color system.

25. An apparatus comprising
at least one processor; and
at least one memory including computer program code, the at least one memory and the computer program code configured to, with the at least one processor, cause the apparatus at least to perform:
restore at least one color component in an input image iteratively with a deblur parameter,
increase the deblur parameter at each iteration,
stop the iteration when an overshooting in the final image exceeds a predetermined value,
define a number of iterations and
determine the quality of the image according to the number of iterations.

26. The apparatus according to claim 25, being arranged in the image processing system of an electronic device.

27. A non-transitory computer-readable storage medium encoded with instructions that, when executed by a computer perform
restoring at least one color component in an input image iteratively with a deblur parameter,
increasing the deblur parameter at each iteration,
stopping the iteration when an overshooting in the final image exceeds a predetermined value,
defining a number of iterations and
determining the quality of the image according to the number of iterations.

* * * * *